(12) United States Patent
Miyazawa

(10) Patent No.: US 9,239,450 B2
(45) Date of Patent: Jan. 19, 2016

(54) ZOOM LENS AND IMAGE-PICKUP APPARATUS HAVING THE SAME

(75) Inventor: Nobuyuki Miyazawa, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 603 days.

(21) Appl. No.: 13/456,522

(22) Filed: Apr. 26, 2012

(65) Prior Publication Data

US 2012/0275035 A1  Nov. 1, 2012

(30) Foreign Application Priority Data

Apr. 26, 2011  (JP) ................... 2011-098522

(51) Int. Cl.
G02B 15/14  (2006.01)
G02B 15/16  (2006.01)

(52) U.S. Cl.
CPC ................... G02B 15/161 (2013.01)

(58) Field of Classification Search
CPC .... G02B 15/14; G02B 13/0045; G02B 13/18; G02B 13/009; G02B 9/34; G02B 13/001
USPC .................................. 359/687, 688
See application file for complete search history.

(56) References Cited

U.S. PATENT DOCUMENTS 4,620,775 A    11/1986 Fujioka
4,934,795 A *   6/1990 Estelle .................. 359/687
7,551,366 B2 *  6/2009 Suzaki et al. ............ 359/687

2009/0167897 A1  7/2009 Fujita
2009/0231727 A1  9/2009 Kawamura
2010/0259817 A1 10/2010 Jannard et al.

FOREIGN PATENT DOCUMENTS

CN    101334514 A   12/2008
JP    2009003342 A   1/2009
JP    2009031636 A   2/2009
JP    2009164847 A   7/2009
JP    2009217122 A   9/2009

OTHER PUBLICATIONS

Official Action issued in CN201210126346.7 mailed Oct. 27, 2014. English translation provided.
Official Action issued in JP2011-098522 mailed Nov. 18, 2014.

* cited by examiner

*Primary Examiner* — Alicia M Harrington
(74) *Attorney, Agent, or Firm* — Rossi, Kimms & McDowell LLP

(57) ABSTRACT

A zoom lens includes a first lens unit having a positive refractive power and arranged closest to an object side. 0.50<Ym5/Yw30<1.00 is satisfied at a predetermined zoom position except for a wide-angle end and a telephoto end where Yw30 denotes an image height that provides a relative illumination of 0.3 at the wide-angle end, and Ym5 denotes an image height that provides the relative illumination of 0.05 at a predetermined zoom position except for a wide-angle end and a telephoto end.

11 Claims, 10 Drawing Sheets

ZOOM LENS AND IMAGE-PICKUP APPARATUS HAVING THE SAME

BACKGROUND OF THE INVENTION

1. Field of the Invention

The present invention relates to a zoom lens and an image-pickup apparatus having the zoom lens.

2. Description of the Related Art

One conventional small and high magnification varying zoom lens is a zoom lens including a lens unit having a positive refractive power arranged closest to the object side. For example, Japanese Patent Laid-Open No. ("JP") 2009-3342 proposes a four-unit zoom lens in which positive, negative, positive and positive units are arranged in order from the object side. JP 2009-164847 discloses an image-pickup apparatus configured to realize electronic zooming with optical zooming and to enable an object image to be observed at a high zooming ratio.

In most of zoom lenses including the lens unit having the positive refractive power arranged closest to the object side, as disclosed in JP 2009-3342, a front lens diameter is determined by an off-axis ray at a position (intermediate focal length) located on the optical axis of the zoom lens, except the wide-angle end and a telephoto end. Usually, a range of an image-pickup element available at the intermediate focal length is utilized from the wide-angle end to the telephoto end.

For a wide working range of the image-pickup element with a small front lens diameter, a minimum necessary light amount at the intermediate focal length is effective, but even this configuration cannot maintain small a front lens diameter in a wide-angle zoom lens. Although JP 2009-3342 provides four lenses to the first lens unit and restrains a large size of a front lens diameter caused by the wide-angle configuration, this configuration is insufficient for the reduced front lens diameter. The conventional electronic zooming, as disclosed in JP 2009-164847, does not limit the zoom lens in the image-pickup apparatus or is silent about a means for reducing the front lens diameter of the wide-angle zoom lens.

SUMMARY OF THE INVENTION

The present invention provides a wide-angle and high magnification varying zoom lens having a small front lens diameter, and an image-pickup apparatus having the zoom lens.

A zoom lens according to the present invention includes a first lens unit having a positive refractive power and arranged closest to an object side. The following conditional expression is satisfied:

$$0.50 < Ym5/Yw30 < 1.00.$$

Yw30 denotes an image height that provides a relative illumination of 0.3 at the wide-angle end, and Ym5 denotes an image height that provides the relative illumination of 0.05 at a predetermined zoom position except for a wide-angle end and a telephoto end.

Further features of the present invention will become apparent from the following description of exemplary embodiments with reference to the attached drawings.

DESCRIPTION OF THE EMBODIMENTS

Figure 1:
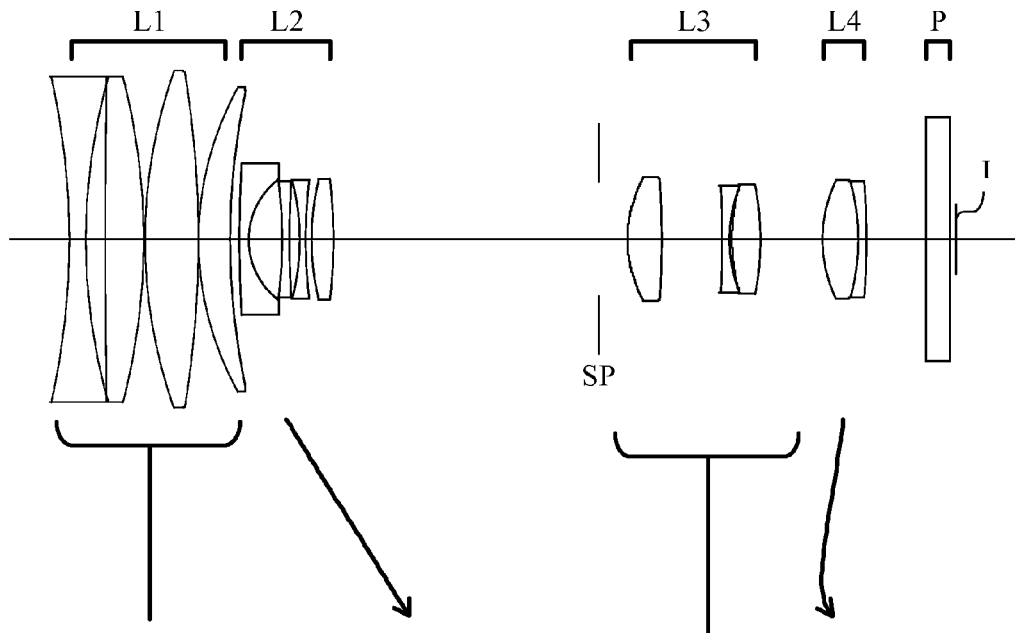
FIG. 1 is a lens sectional view of an optical system according to numerical example 1.
Figure 2:
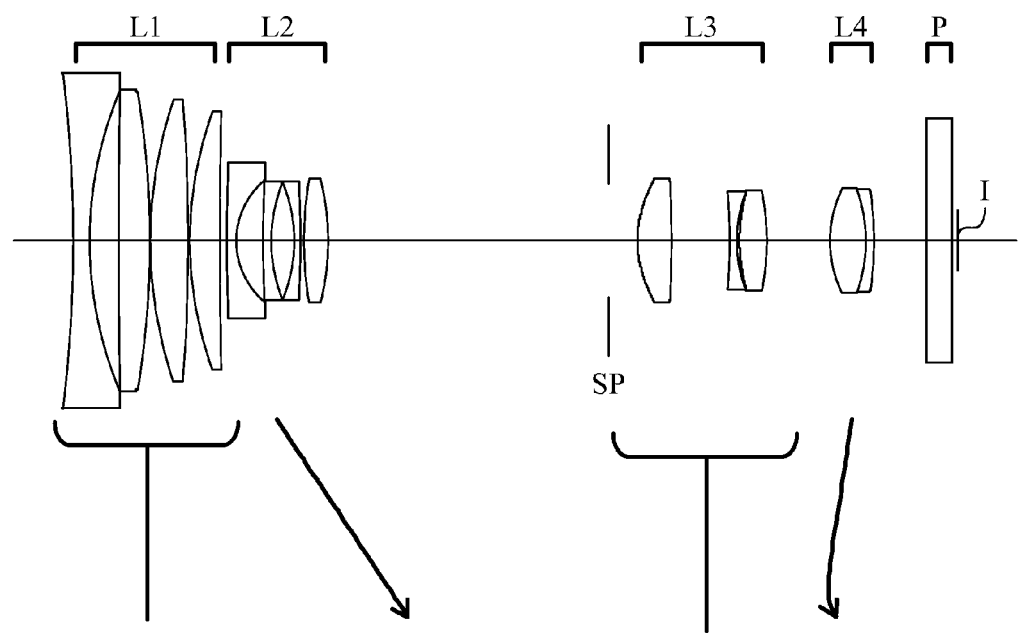
FIG. 2 is a lens sectional view of an optical system according to numerical example 2.
Figure 3:
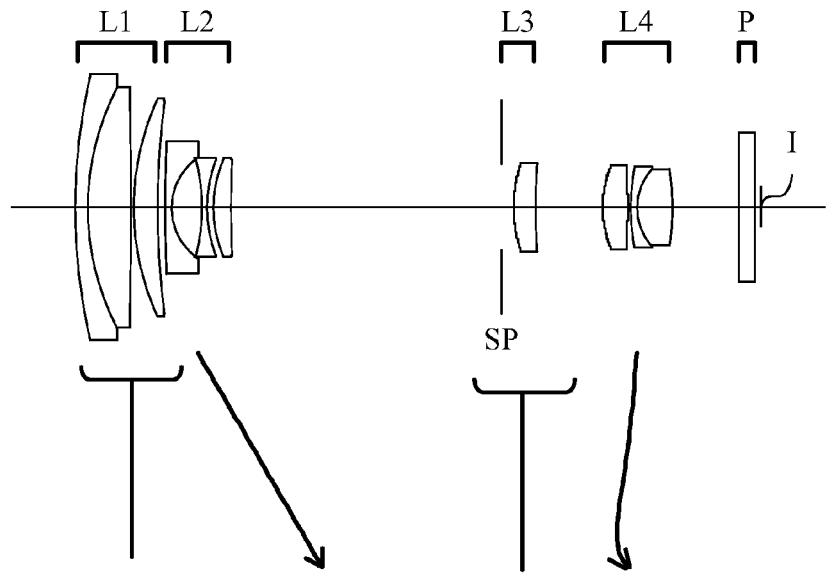
FIG. 3 is a lens sectional view of an optical system according to numerical example 3.
Figure 4:
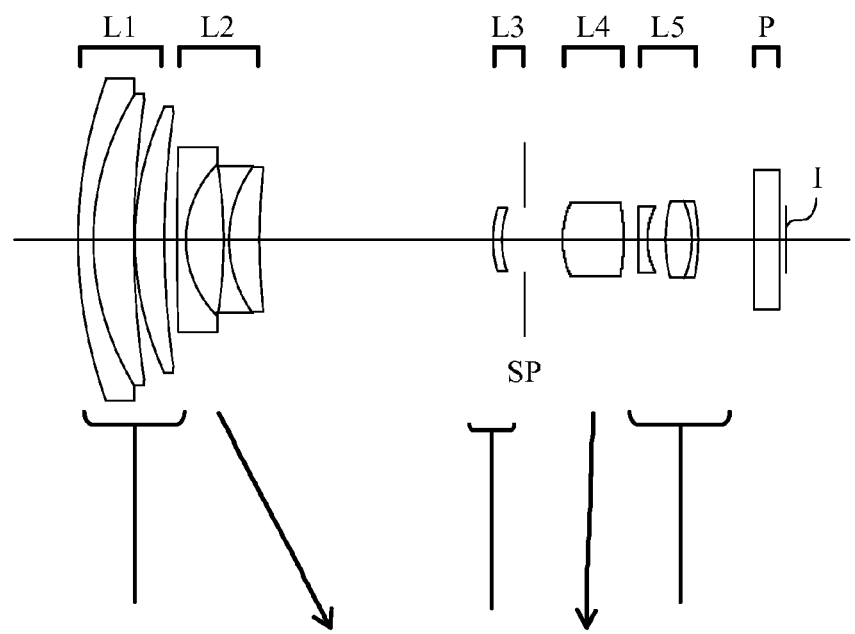
FIG. 4 is a lens sectional view of an optical system according to numerical example 4.
Figure 5A:
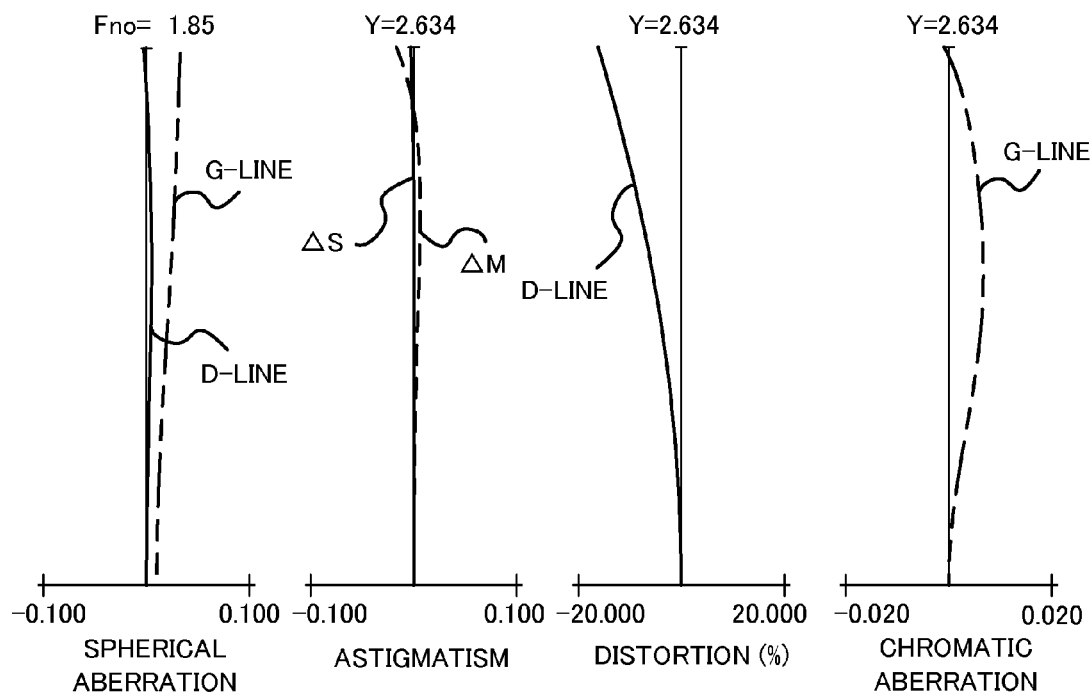
FIGS. 5A-5C are aberrational diagrams at a wide angle end, an intermediate focal length, and a telephoto end according to the numerical example 1.
Figure 5B:
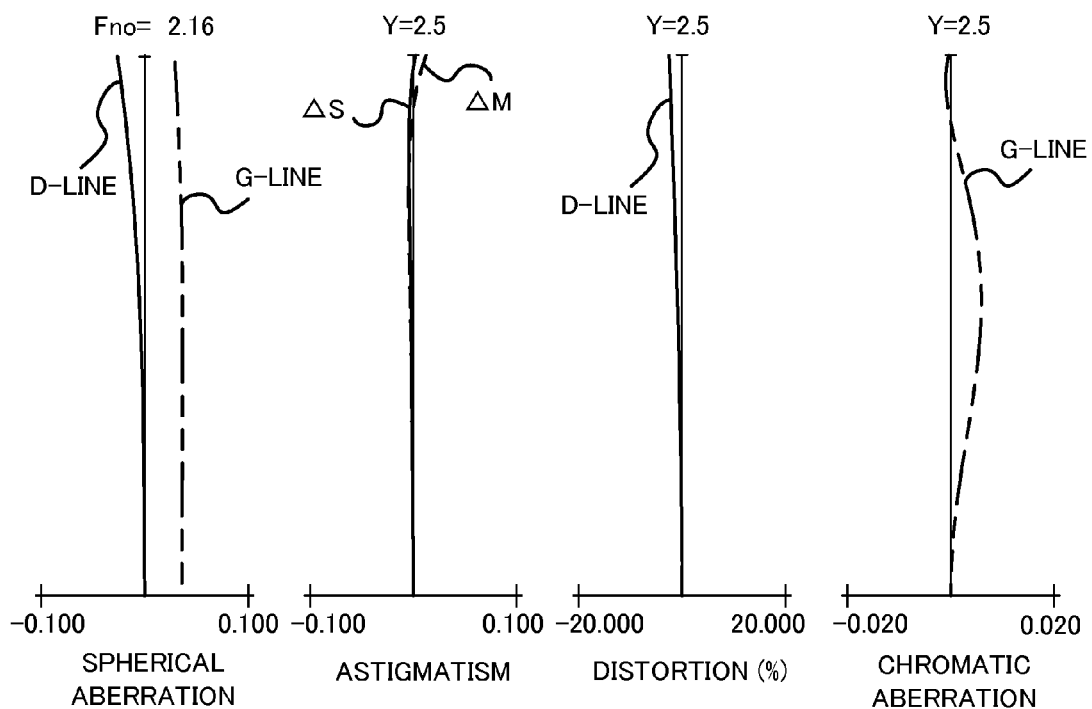
Figure 5C:
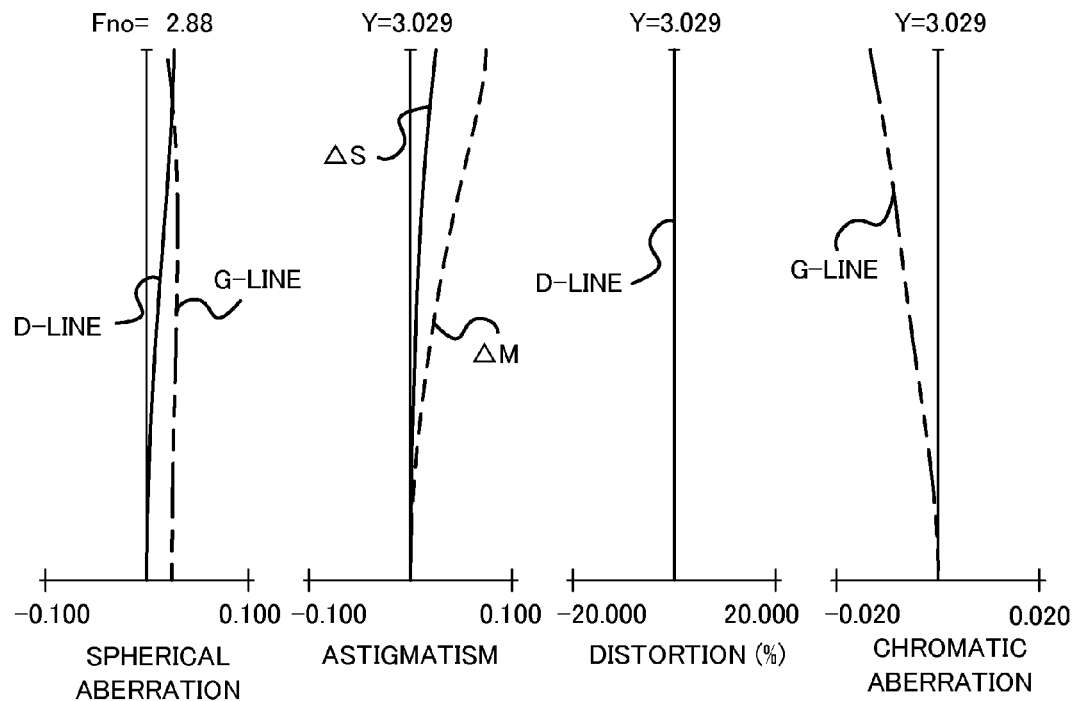
Figure 6A:
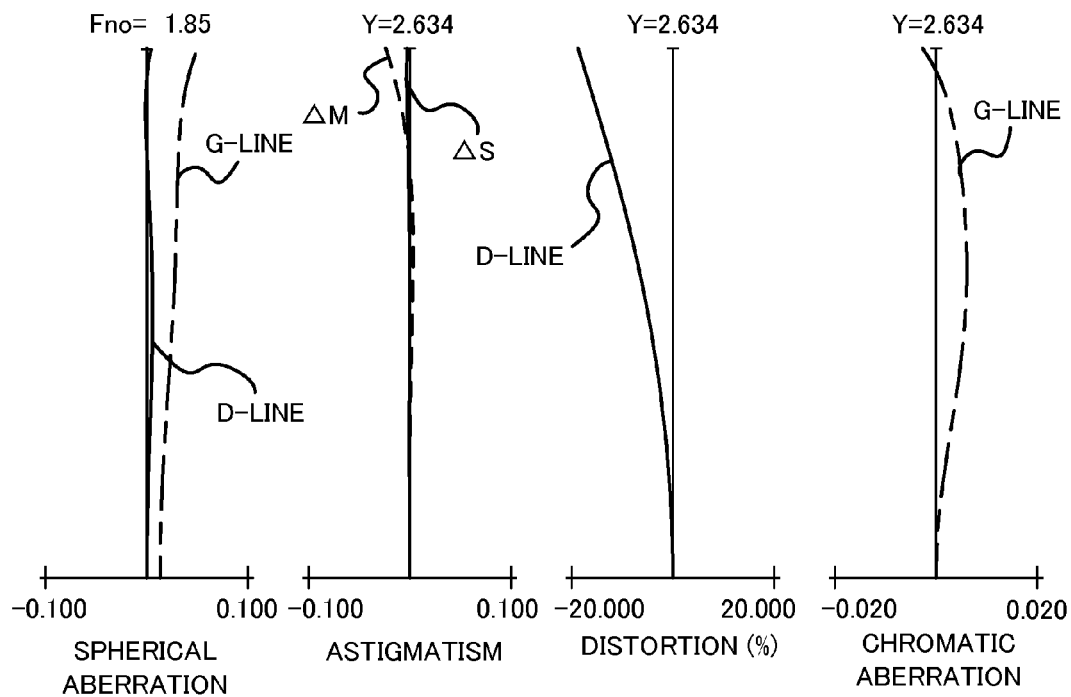
FIGS. 6A-6C are aberrational diagrams at a wide angle end, an intermediate focal length, and a telephoto end according to the numerical example 2.
Figure 6B:
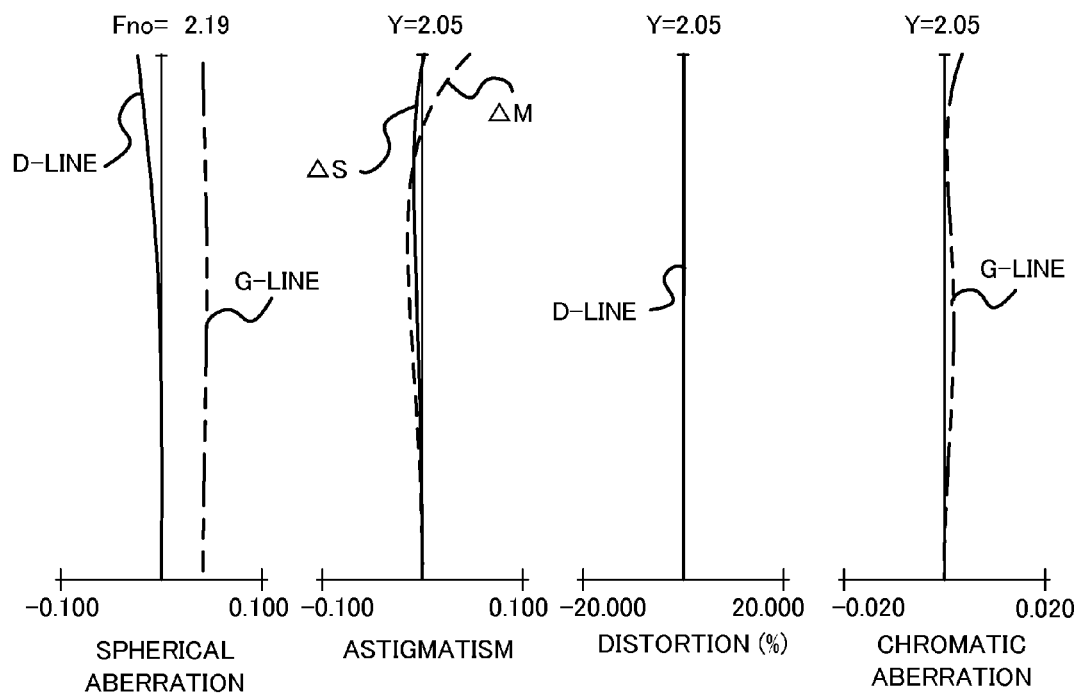
Figure 6C:
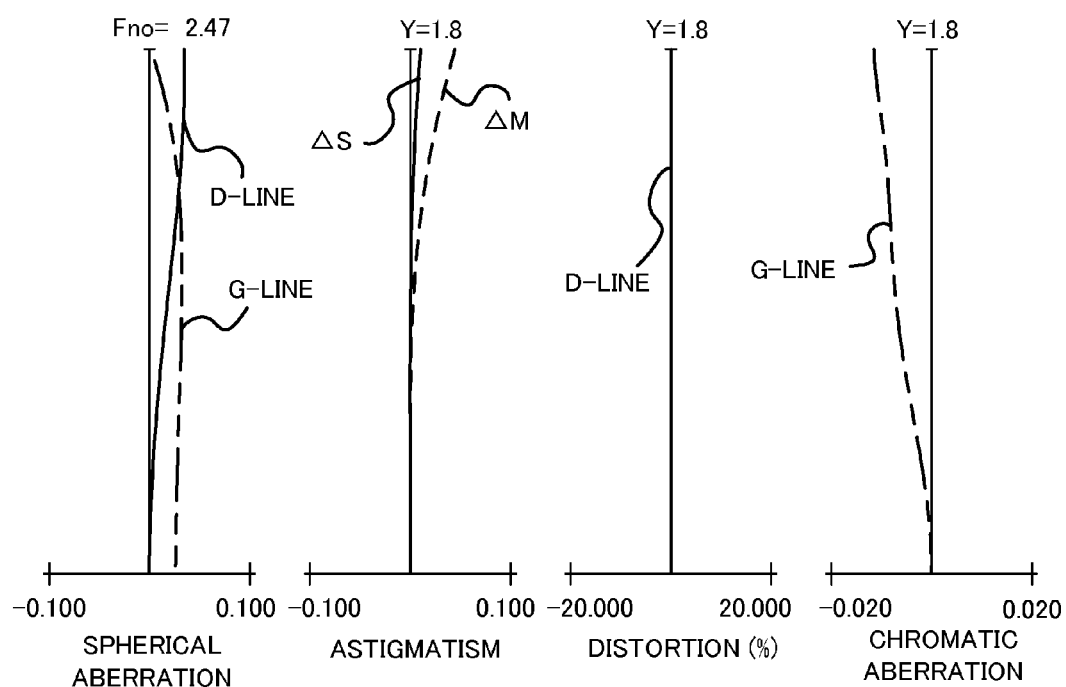
Figure 7A:
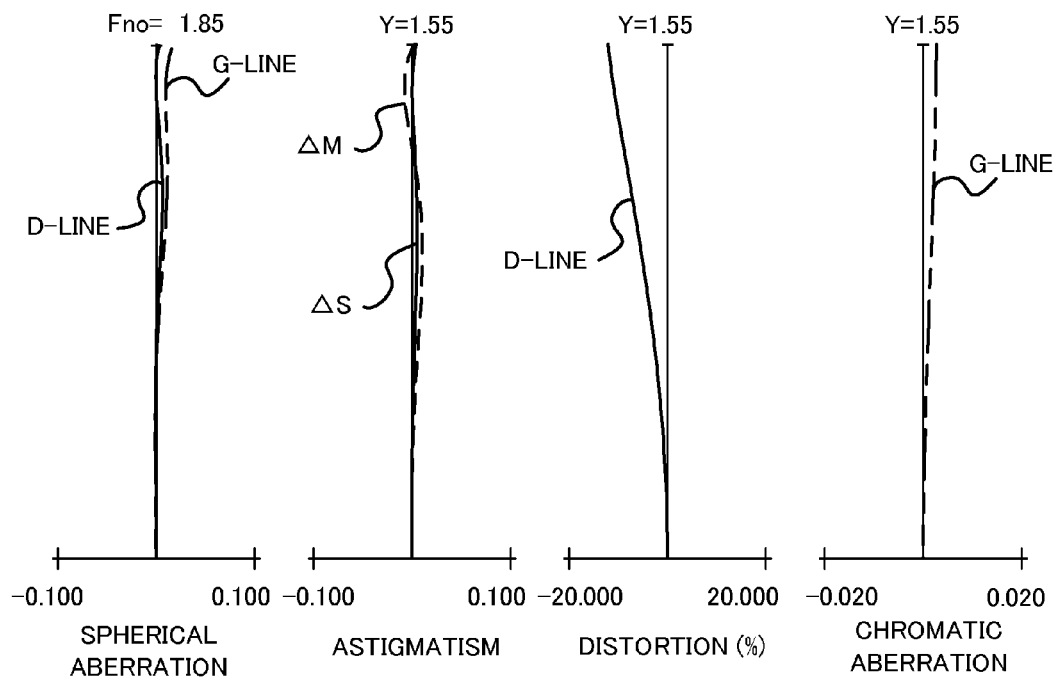
FIGS. 7A-7C are aberrational diagrams at a wide angle end, an intermediate focal length, and a telephoto end according to the numerical example 3.
Figure 7B:
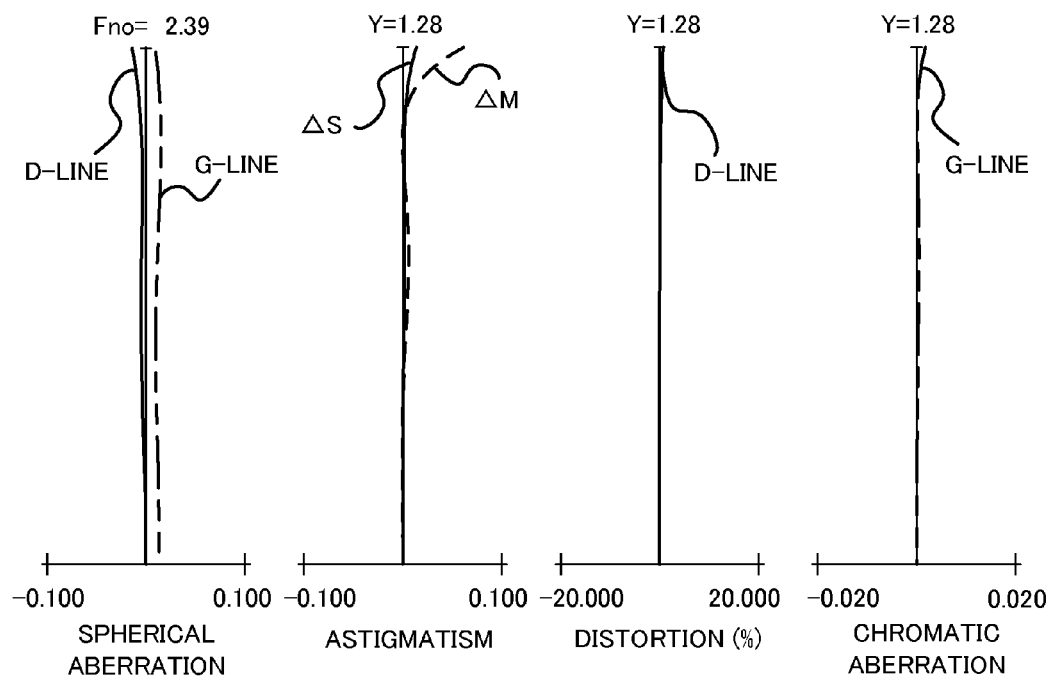
Figure 7C:
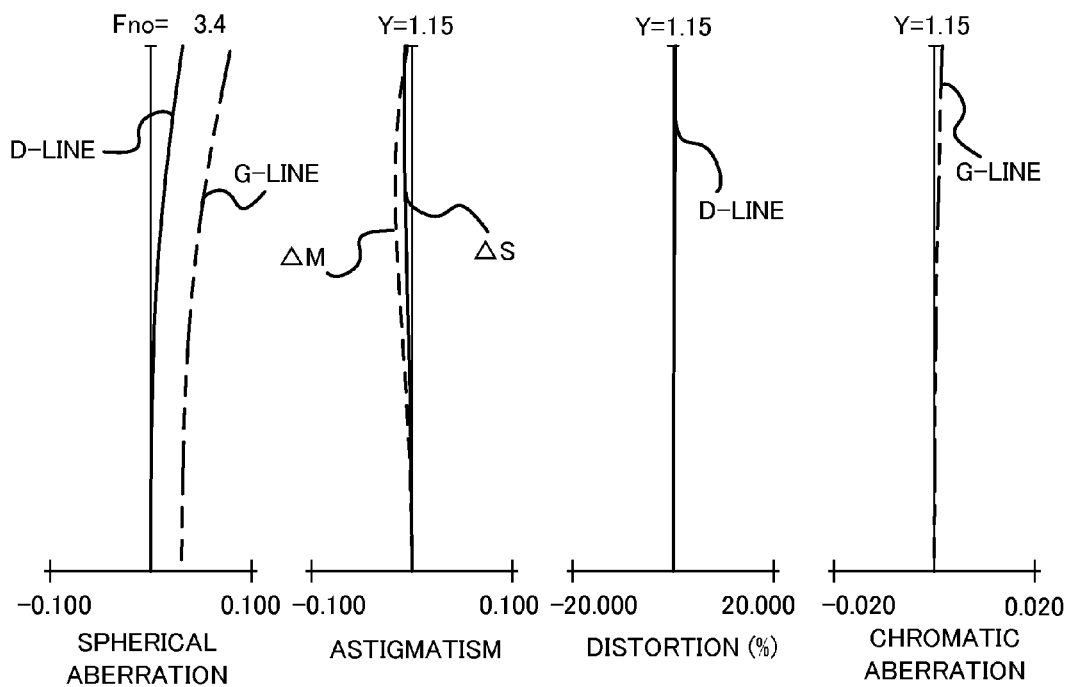
Figure 8A:
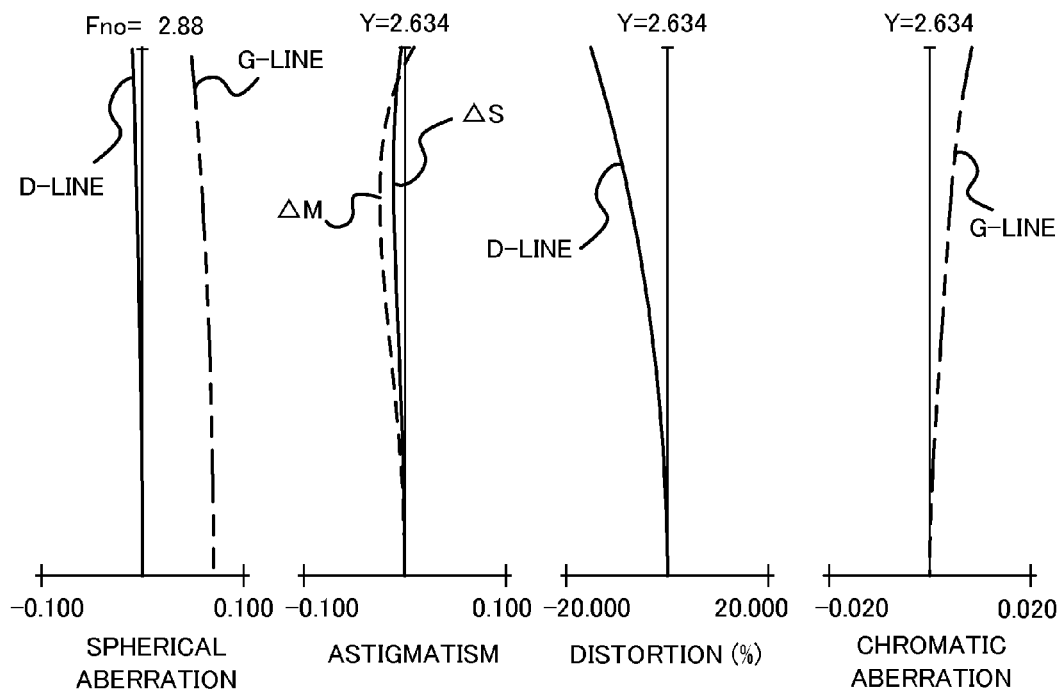
FIGS. 8A-8C are aberrational diagrams at a wide angle end, an intermediate focal length, and a telephoto end according to the numerical example 4.
Figure 8B:
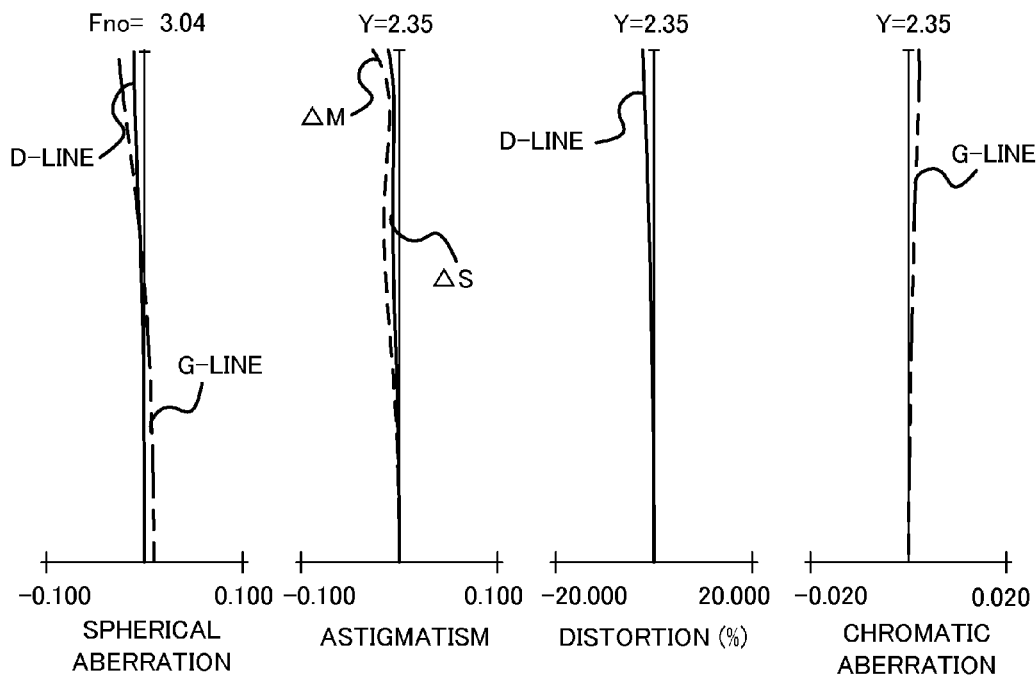
Figure 8C:
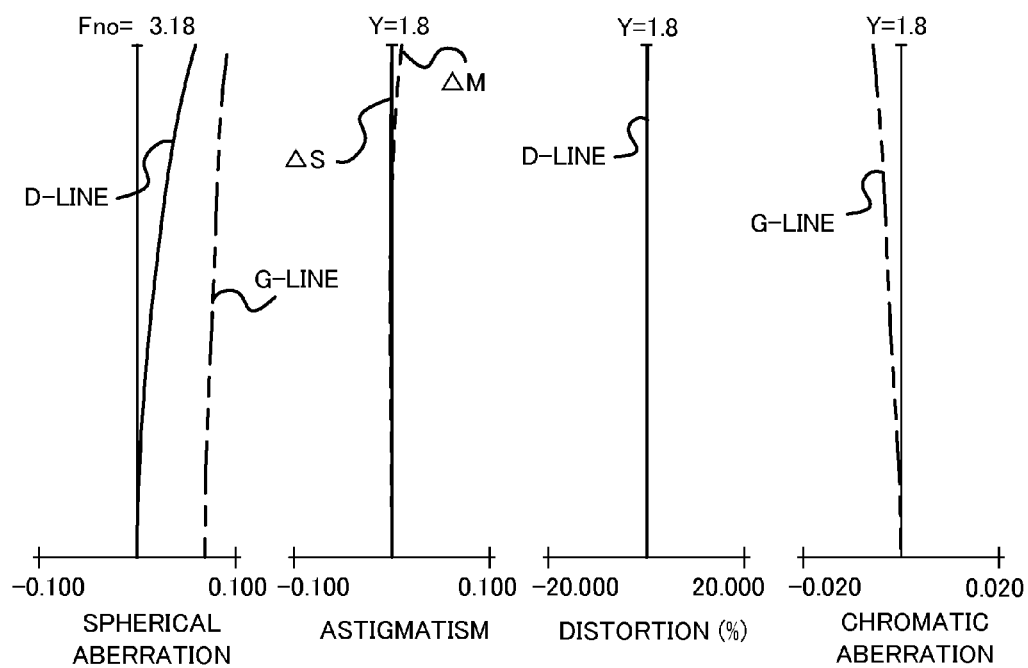

The zoom lens of this embodiment includes a first lens having a positive refractive power arranged closest to an object side for a high magnification variation. This embodiment satisfies the following conditional expression for a size reduction:

$$0.50 < Ym5/Yw30 < 1.00 \tag{1}$$

Yw30 denotes an image height that provides a relative illumination of 0.3 at the wide angle end. Ym5 denotes an image height that provides a relative illumination of 0.05 at a zoom position (magnification varying position) (intermediate focal length) except the wide-angle end and the telephoto end. This embodiment requires the zoom position (intermediate focal length) that provides Ym5 and satisfies the conditional expression 1.

An aperture ratio is defined as a ratio of an off-axial entrance pupil area to an axial entrance pupil area. The relative illumination is a luminance ratio calculated by multiplying the aperture ratio by a cosine fourth law and a distortion component. The cosine fourth law satisfies the following relationship where e is an incident angle of light entering the lens to the optical axis, I is a post-incidence luminance of the light, and Io is a pre-incidence luminance of the light:

$$I = Io \cos^4 \theta$$

The relative illumination is a ratio expressed as the brightness at the predetermined image height to the brightness at the center on the imaging surface, and it is 1 when the brightness at the predetermined image height is equal to the brightness at the center.

The conditional expression (1) determines a range of the light that reaches from the wide-angle end and the intermediate focal length to the imaging surface. In general, the relative illumination of at least about 0.3 is necessary to avoid shading around the image. Thus, conventionally, at an image height of the wide angle end that provides a relative illumination of 0.3, the relative illumination of about 0.3 is secured in the overall zooming region. At the same zooming position, an image height that provides a relative illumination of 0.05 is higher than an image height that provides a relative illumination of 0.3. Hence, a value in the conventional configuration exceeds the upper limit value of the conditional expression (1).

This embodiment reduces a front lens diameter by narrowing a range of the light reaching the imaging surface at the intermediate focal length, because this range determines the front lens diameter. Thus, the value of this embodiment does not exceed the upper limit value of the conditional expression (1). At this time, a smaller number of pixels are used for the intermediate focal length than the wide-angle end in the image-pickup apparatus that include a solid state image-pickup element, such as a CCD. Since it is a direction narrowing the image-pickup range from the wide-angle end, an output image can be properly zoomed with high quality because the recent solid state image-pickup element has a large number of pixels.

However, even when the range of the light reaching the imaging surface is narrowed at the intermediate focal length so that the value exceeds the lower limit value of the conditional expression (1), the front lens diameter is not fully reduced because the front lens diameter is determined by the wide-angle end and the telephoto end.

The conditional expression (1) may be replaced with the following conditional expression (1a).

$$0.70 < Ym5/Yw30 < 0.95 \tag{1a}$$

While the conditional expression (1) relies upon the image height at the wide-angle end which provides a relative illumination of 0.3, the effect of this embodiment reveals with the reference focal length or relative illumination which shifts in a preset range.

The zoom lens of this embodiment includes, in order on the object side of the diaphragm, a first lens unit having a positive refractive power, and a second lens unit having a negative refractive power, and realizes zooming by changing an interval between the first lens unit and the second lens unit. The zoom lens of this embodiment may satisfy the following conditional expressions:

$$0.20 < S1 < 0.50 \tag{2}$$

$$0.00 \leq S2/S1 < 0.17 \tag{3}$$

Herein, S1 denotes a first relative illumination at a first image height of a first zoom position. S2 denotes a second relative illumination at the first image height of a second zoom position. According to this embodiment, the first zoom position exists in a section in which the interval between the first lens unit and the second lens unit is changed by a variation amount from the wide-angle end to the telephoto end multiplied by 0 to 0.1. The second zoom position exists in a section in which the interval between the first lens unit and the second lens unit is changed by the variation amount from the wide-angle end to the telephoto end multiplied by 0.3 to 0.8.

The conditional expression (2) determines an image height that calculates S2. When the relative illumination is so high that the value exceeds the upper limit value of the conditional expression (2), the wide-angle end and the intermediate focal length have similar relative illuminations and the image height that provides the effect of this embodiment cannot be determined. However, this does not prohibit the relative illumination of the image-pickup apparatus from exceeding the upper limit value. The image height at which the relative illumination is so low that the value exceeds the lower limit value of the conditional expression (2) is not suitable for the image-pickup apparatus.

The conditional expression (2) may be replaced with the following conditional expression (2a):

$$0.30 \leq S1 < 0.50 \tag{2a}$$

The conditional expression (3) determines a ratio of the relative illumination between the wide-angle end and the intermediate focal length at the image height determined by the conditional expression (2). When the value exceeds the upper limit value of the conditional expression (3), the front lens diameter increases because a large relative illumination of the intermediate focal length is taken. The lower limit value of the conditional expression (3) means that the relative illumination at the intermediate focal length becomes zero, and thus the value never exceeds the lower limit value.

In the image-pickup apparatus including the above zoom lens, this embodiment provides the first lens unit having the positive refractive power arranged closest to the object side, and satisfies the following conditional expression:

$$Sm < Sw \tag{4}$$

Sw is a relative illumination at a wide-angle end and a maximum image height of the wide-angle end. This embodiment determines that there is a zoom position (intermediate focal length) that satisfies the conditional expression (4) located on the optical path of the zoom lens except the wide-angle end and the telephoto end. Sm is a relative illumination at the intermediate focal length and the maximum image height of the wide-angle end.

The maximum image height at the wide-angle end is located in a working range of the image-pickup element used to form an output image, and it is a working range when the image stabilization function is set inactive in the image-pickup apparatus configured to stabilize an image by offsetting the working range.

The conditional expression (4) determines a ratio of the relative illumination between the wide-angle end and the intermediate focal length, at an image height used for an image-pickup apparatus. When the conditional expression (4) is not satisfied, the front lens diameter increases because a relative illumination at the intermediate focal length is much taken.

The conditional expression (4) is not satisfied when both the relative illumination at the wide-angle end and the relative illumination at the intermediate focal length increase. In this case, the field angle at the wide-angle end can be widely maintained by increasing the maximum image height and the mounted zoom lens is not fully utilized.

This embodiment may further satisfy the following conditional expression:

$$-0.8 < fw/f2 < -0.4 \tag{5}$$

Herein, fw denotes a focal length of the overall system at the wide-angle end, and f2 denotes a focal length of the second lens unit.

The conditional expression (5) determines a ratio between the focal length of the wide-angle end and the focal length of the second lens unit. When the value exceeds the upper limit value of the conditional expression (5), it is difficult to correct a curvature of field at the wide-angle end. Alternatively, a variation amount of an interval between the first and second lens units increases so as to obtain a predetermined zooming ratio, and the overall length consequently increases. When the value exceeds the lower limit value of the conditional expression (5), the field angle at the wide-angle end becomes narrow and the effect of this embodiment cannot be fully obtained.

The conditional expression (5) may be replaced with the following conditional expression (5a):

$$-0.75 < fw/f2 < -0.42 \tag{5a}$$

This embodiment may further satisfy the following conditional expression:

$$0.05 < fw/f1 < 0.14 \tag{6}$$

Herein, fw denotes a focal length of the overall system at the wide-angle end, and f1 denotes a focal length of the first lens unit.

The conditional expression (6) determines a ratio between the focal length of the wide-angle end and the focal length of the first lens unit. When the value exceeds the upper limit value of the conditional expression (6), the field angle at the wide-angle end becomes narrow and the effect of this embodiment cannot be fully obtained. Alternatively, a correction of a spherical aberration or coma becomes difficult at the telephoto end.

When the value exceeds the lower limit value of the conditional expression (6), the correction of the curvature of field becomes difficult at the wide-angle end or a variation amount of an interval between the first lens unit and the second lens unit increases so as to obtain a predetermined zooming ratio and the overall length consequently increases.

The conditional expression (6) may be replaced with the following conditional expression (6a):

$$0.06 < fw/f1 < 0.12 \quad (6a)$$

This embodiment may further satisfy the following conditional expression:

$$31° < \tan^{-1}(Yw/fw) < 48° \quad (7)$$

Yw is a maximum image height at the wide-angle end, and fw is a focal length of an overall system at the wide-angle end. The maximum image height at the wide-angle end is a working range of the image-pickup element used to form an output image, as described above, and it is a working range when the image stabilization function is set inactive in the image-pickup apparatus that is configured to stabilize an image by offsetting the working range.

The conditional expression (7) determines the field angle at the wide-angle end. When the value exceeds the upper limit value of the conditional expression (7), the number of lenses in the first lens unit increases so as to properly correct the curvature of field and the lateral chromatic aberration at the wide-angle end. As a result, the size reduction and the wide-angle configuration become difficult. When the value exceeds the lower limit value of the conditional expression (7), the field angle at the wide-angle end narrows and the effect of this embodiment cannot be fully obtained.

The conditional expression (7) may be replaced with the following conditional expression (7a):

$$33° < \tan^{-1}(Yw/fw) < 41° \quad (7a)$$

This embodiment configures three or less lens units movable in the optical axis direction during zooming, and the diaphragm SP may be fixed in the optical axis direction during the zooming.

When there are more than three movable lens units in the optical axis direction during zooming, there is a solution that reduces the front lens diameter and maintains the wide angle configuration using moving locus of each lens unit. However, the increased number of movable units causes a large barrel mechanism and thus the reduced size of the entire lens unit becomes difficult.

In addition, as the number of lens-unit moving mechanisms increases, the cost also increases. When the diaphragm is configured movable, the flexible printed circuit ("FPC") becomes longer and increases the cost.

The zoom lens may further include a third lens unit that is arranged on the image side of the second lens unit along the optical path, and has a positive or negative refractive power. In this case, the first lens unit and the third lens unit may be fixed in the optical axis direction during zooming.

The movable first lens unit is disadvantageous in an increased pressure applied when the front lens is wiped out during the image pickup or a taken image shakes due to an inclination of the first lens unit when the first lens unit is driven.

The third lens unit is close to the diaphragm, and likely to have a large diameter when it is a lens having a high F-number. Hence, when the third lens is a movable lens having a high F-number, the outer diameter of the barrel increases in the whole movable range.

Nine lenses or less may be arranged on the object side of the diaphragm SP. As the number of lenses on the object of the diaphragm increases, the entrance pupil position of the wide-angle end is movable to the object side and the front lens diameter is reduced in the wide-angle configuration. However, the increased number of lenses makes an overall length longer and the barrel heavier.

FIGS. 1, 2, 3 and 4 are lens sectional views according to numerical examples 1 to 4, which will be described later. FIGS. 5A to 8C are aberrational diagrams of the spherical aberration, the astigmatism, the distortion, and the lateral chromatic aberration according to each numerical embodiment. More specifically, FIGS. 5A, 6A, 7A, and 8A are aberrational diagrams at the wide-angle end, FIGS. 5B, 6B, 7B, and 8B are aberrational diagrams at the intermediate focal length, and FIGS. 5C, 6C, 7C, and 8C are aberrational diagrams at the telephoto end. In the spherical aberration diagram, a solid line denotes the d-line, and an alternate long and two short dashes line denotes the g-line. In the astigmatism diagram, a solid line denotes a saggital section ΔS, and a broken line denotes a meridional section ΔM. In the distortion diagram, a solid line denotes the d-line. In the lateral chromatic aberration diagram, an alternate long and two short dashes line denotes the g-line. Fno denotes an F-number.

In FIGS. 1 to 4, L1 to L5 denote the first to fifth lens units. SP denotes a diaphragm (or stop). P denotes a glass block, such as a CCD face plate and a low-pass filter. I denotes an image plane. The diaphragm SP is arranged on an image side of the first lens unit L1 having a positive refractive power and the second lens unit L2 having a negative refractive power, along the optical path. In other words, the first lens unit L1 and the second lens unit L2 are arranged on the object side of the diaphragm SP, and are arranged in order from the object side along the optical path.

This embodiment moves each unit as illustrated by arrows in FIGS. 1 to 4 during zooming from the wide-angle end to the telephoto end. The fourth lens unit is moved during focusing.

In the numerical example, Ri denotes a radius of curvature of an i-th surface from the object side, Di denotes an interval (lens thickness or air interval) between the i-th surface and the (i+1)-th surface, Ni and vi are refractive index and Abbe number of a material of an i-th lens.

An aspheric shape is expressed as follows where an optical axis direction is set to the X-axis, a direction perpendicular to the optical axis is set to the h-axis, and the light propagating direction is set positive. R is a paraxial radius of curvature, k, A3, A4, A5, A6, A7, A8, A9, A10, and A11 denote aspheric coefficients:

$$X = \frac{(1/R)h^2}{1 + \sqrt{1-(1+k)(h/R)^2}} + A4h^4 + A6h^6 + A8h^8 + A10h^{10} + A3h^3 + A5h^5 + A7h^7 + A9h^9 + A11h^{11}$$

"e-Z" means "$10^{-z}$," for example.

Numerical Example 1 unit mm
surface data

| surface number | r | d | nd | vd | effective diameter |
|---|---|---|---|---|---|
| 1 | −63.208 | 1.50 | 1.84666 | 23.9 | 27.03 |
| 2 | 51.331 | 1.73 | | | 26.51 |
| 3 | 1468.263 | 3.18 | 1.60311 | 60.6 | 26.53 |
| 4 | −55.161 | 0.16 | | | 27.01 |
| 5 | 43.320 | 4.51 | 1.80400 | 46.6 | 27.97 |
| 6 | −87.750 | 0.14 | | | 27.78 |
| 7 | 27.022 | 2.64 | 1.77250 | 49.6 | 25.10 |
| 8 | 60.837 | (variable) | | | 24.51 |
| 9 | 105.593 | 0.80 | 1.83481 | 42.7 | 12.10 |
| 10 | 6.455 | 2.77 | | | 9.29 |
| 11 | −36.862 | 0.70 | 1.83481 | 42.7 | 9.07 |
| 12 | 71.649 | 0.80 | | | 8.94 |
| 13 | −19.965 | 0.60 | 1.80400 | 46.6 | 8.92 |
| 14 | 41.334 | 0.47 | | | 9.12 |
| 15 | 21.352 | 1.79 | 1.92286 | 18.9 | 9.46 |
| 16 | −42.672 | (variable) | | | 9.46 |
| 17(diaphragm) | ∞ | (variable) | | | 8.87 |
| 18* | 10.555 | 2.81 | 1.58313 | 59.4 | 9.70 |
| 19 | −80.035 | 5.19 | | | 9.39 |
| 20 | −85.967 | 0.70 | 1.76182 | 26.5 | 8.13 |
| 21 | 12.102 | 0.26 | | | 8.13 |
| 22* | 16.137 | 2.33 | 1.58313 | 59.4 | 8.17 |
| 23 | −23.033 | (variable) | | | 8.43 |
| 24 | 11.593 | 2.98 | 1.60311 | 60.6 | 9.30 |
| 25 | −18.419 | 0.70 | 1.92286 | 18.9 | 9.00 |
| 26 | −61.971 | (variable) | | | 8.91 |
| 27 | ∞ | 2.16 | 1.51633 | 64.1 | 20.00 |
| 28 | ∞ | 1.00 | | | 20.00 |
| image plane | ∞ | | | | | aspheric data eighteenth surface

K = −9.17104e−001 A 4 = 4.19710e−006 A 6 = 1.71587e−007
A 8 = −1.29887e−009 twenty-second surface

K = −1.08261e+000 A 4 = −7.66519e−005 various data
zooming ratio 9.69

| | wide-angle | intermediate | telephoto |
|---|---|---|---|
| focal length | 3.81 | 5.91 | 36.88 |
| F-number | 1.85 | 2.16 | 2.88 |
| field angle | 34.67 | 22.93 | 4.70 |
| image height | 2.63 | 2.50 | 3.03 |
| lens overall length | 76.10 | 76.10 | 76.10 |
| BF | 7.61 | 9.14 | 9.55 |
| d8 | 0.89 | 7.24 | 22.08 |
| d16 | 22.96 | 16.60 | 1.76 |
| d17 | 2.44 | 2.44 | 2.44 |
| d23 | 5.45 | 3.91 | 3.50 |
| d26 | 5.19 | 6.72 | 7.13 | zoom lens unit data

| unit | starting surface | focal length |
|---|---|---|
| 1 | 1 | 30.97 |
| 2 | 9 | −6.92 |
| 3 | 17 | ∞ |
| 4 | 18 | 18.54 |
| 5 | 24 | 20.16 |
| 6 | 27 | ∞ |

Numerical Example 2 unit mm
surface data

| surface number | r | d | nd | vd | effective diameter |
|---|---|---|---|---|---|
| 1 | −117.473 | 1.50 | 1.84666 | 23.9 | 27.88 |
| 2 | 33.394 | 2.52 | | | 25.00 |
| 3 | 1145.825 | 2.56 | 1.60311 | 60.6 | 24.94 |
| 4 | −76.822 | 0.16 | | | 24.58 |
| 5 | 37.601 | 3.23 | 1.80400 | 46.6 | 23.29 |
| 6 | −159.216 | 0.14 | | | 22.95 |
| 7 | 32.254 | 2.53 | 1.77250 | 49.6 | 21.17 |
| 8 | 439.187 | (variable) | | | 20.56 |
| 9 | 219.534 | 0.80 | 1.83481 | 42.7 | 12.43 |
| 10 | 6.785 | 2.23 | | | 9.48 |
| 11 | 103.316 | 0.70 | 1.83400 | 37.2 | 9.26 |
| 12 | 13.379 | 1.93 | | | 8.81 |
| 13 | −12.907 | 0.60 | 1.83400 | 37.2 | 8.79 |
| 14 | −228.826 | 0.30 | | | 9.18 |
| 15 | 30.515 | 2.01 | 1.92286 | 18.9 | 9.56 |
| 16 | −21.407 | (variable) | | | 9.68 |
| 17(diaphragm) | ∞ | (variable) | | | 8.85 |
| 18* | 9.904 | 2.85 | 1.58313 | 59.4 | 9.64 |
| 19 | −114.140 | 5.02 | | | 9.27 |
| 20 | −45.962 | 0.70 | 1.76182 | 26.5 | 7.29 |
| 21 | 11.565 | 0.19 | | | 7.31 |
| 22* | 14.042 | 2.27 | 1.58313 | 59.4 | 7.34 |
| 23 | −20.617 | (variable) | | | 7.58 |
| 24 | 10.108 | 2.97 | 1.51742 | 52.4 | 8.05 |
| 25 | −13.034 | 0.70 | 1.92286 | 18.9 | 7.70 |
| 26 | −29.799 | (variable) | | | 7.66 |
| 27 | ∞ | 2.16 | 1.51633 | 64.1 | 20.00 |
| 28 | ∞ | 1.00 | | | 20.00 |
| image plane | ∞ | | | | | aspheric data eighteenth surface

K = −8.70480e−001 A 4 = 2.14356e−005 A 6 = 3.89318e−007
A 8 = −5.07624e−009 twenty-second surface

K = −2.32538e−001 A 4 = −1.48468e−004 various data
zooming ratio 9.69

| | wide-angle | intermediate | telephoto |
|---|---|---|---|
| focal length | 3.30 | 8.17 | 31.94 |
| F-number | 1.85 | 2.19 | 2.47 |
| field angle | 38.62 | 14.09 | 3.23 |
| image height | 2.63 | 2.05 | 1.80 |
| lens overall length | 75.84 | 75.84 | 75.84 |
| BF | 7.04 | 9.86 | 9.79 |
| d8 | 0.70 | 13.05 | 23.16 |
| d16 | 24.24 | 11.88 | 1.77 |
| d17 | 2.44 | 2.44 | 2.44 |
| d23 | 5.54 | 2.72 | 2.78 |
| d26 | 4.61 | 7.43 | 7.37 | zoom lens unit data

| unit | starting surface | focal length |
|---|---|---|
| 1 | 1 | 30.86 |
| 2 | 9 | −6.90 |
| 3 | 17 | ∞ |
| 4 | 18 | 18.44 |
| 5 | 24 | 19.68 |
| 6 | 27 | ∞ |

Numerical Example 3 unit mm
surface data

| surface number | r | d | nd | vd | effective diameter |
|---|---|---|---|---|---|
| 1 | 46.043 | 1.00 | 1.84666 | 23.9 | 20.00 |
| 2 | 20.457 | 0.00 | | | 17.91 |
| 3 | 20.457 | 3.40 | 1.60311 | 60.6 | 17.91 |
| 4 | −408.794 | 0.20 | | | 17.41 |
| 5 | 20.317 | 1.85 | 1.80400 | 46.6 | 16.18 |
| 6 | 62.895 | (variable) | | | 15.70 |
| 7 | 121.383 | 0.50 | 1.88300 | 40.8 | 9.32 |
| 8 | 4.776 | 2.30 | | | 6.96 |
| 9 | −14.967 | 0.50 | 1.80400 | 46.6 | 6.71 |
| 10 | 10.483 | 0.46 | | | 6.54 |
| 11 | 9.625 | 1.42 | 1.92286 | 18.9 | 6.72 |
| 12 | 104.343 | (variable) | | | 6.56 |
| 13(diaphragm) | ∞ | 1.00 | | | 5.79 |
| 14* | 10.660 | 1.70 | 1.58313 | 59.4 | 6.06 |
| 15 | 44.597 | (variable) | | | 5.95 |
| 16* | 8.646 | 1.98 | 1.58313 | 59.4 | 5.69 |
| 17* | −43.414 | 0.22 | | | 5.51 |
| 18 | 16.689 | 0.50 | 1.80518 | 25.4 | 5.39 |
| 19 | 4.515 | 2.67 | 1.51742 | 52.4 | 5.10 |
| 20 | −18.901 | (variable) | | | 4.95 |
| 21 | ∞ | 1.30 | 1.51633 | 64.1 | 10.80 |
| 22 | ∞ | 1.00 | | | 10.80 |
| image plane | ∞ | | | | | aspheric data fourteenth surface

K = −5.11436e+000 A 4 = 2.92010e−004 A 6 = −4.95346e−006
A 8 = −4.82938e−008 sixteenth surface

K = −4.64721e−001 A 4 = 1.40584e−004 A 6 = −1.28735e−005
A 8 = 2.44096e−006 A10 = −1.10622e−007 seventeenth surface

K = −1.46136e+001 A 4 = 2.72469e−004 various data
zooming ratio 19.24

| | wide-angle | intermediate | telephoto |
|---|---|---|---|
| focal length | 2.15 | 4.14 | 41.33 |
| F-number | 1.85 | 2.39 | 3.40 |
| field angle | 35.81 | 17.18 | 1.59 |
| image height | 1.55 | 1.28 | 1.15 |
| lens overall length | 54.14 | 54.14 | 54.14 |
| BF | 7.18 | 8.22 | 8.32 |
| d6 | 0.65 | 7.51 | 20.24 |
| d12 | 21.29 | 14.44 | 1.70 |
| d15 | 5.32 | 4.28 | 4.17 |
| d20 | 5.32 | 6.36 | 6.47 | zoom lens unit data

| unit | starting surface | focal length |
|---|---|---|
| 1 | 1 | 28.77 |
| 2 | 7 | −4.46 |
| 3 | 13 | 23.59 |
| 4 | 16 | 11.31 |
| 5 | 21 | ∞ |

Numerical Example 4 unit mm
surface data

| surface number | r | d | nd | vd | effective diameter |
|---|---|---|---|---|---|
| 1 | 37.272 | 1.19 | 1.92286 | 18.9 | 24.40 |
| 2 | 21.883 | 3.17 | 1.71300 | 53.9 | 21.96 |
| 3 | 74.166 | 0.17 | | | 21.24 |
| 4 | 25.034 | 2.23 | 1.88300 | 40.8 | 19.94 |
| 5 | 69.463 | (variable) | | | 19.22 |
| 6 | 489.519 | 0.68 | 2.00100 | 29.1 | 13.56 |
| 7 | 8.354 | 2.88 | | | 10.85 |
| 8 | −36.020 | 0.56 | 1.70154 | 41.2 | 10.63 |
| 9 | 9.759 | 2.38 | 1.94595 | 18.0 | 10.31 |
| 10 | 49.874 | (variable) | | | 10.01 |
| 11 | 8.153 | 0.68 | 1.84666 | 23.9 | 4.01 |
| 12 | 7.260 | 1.79 | | | 3.89 |
| 13(diaphragm) | ∞ | (variable) | | | 4.15 |
| 14* | 6.907 | 4.82 | 1.76802 | 49.2 | 4.72 |
| 15* | −14.216 | (variable) | | | 4.38 |
| 16* | −48.237 | 0.67 | 1.82115 | 24.1 | 4.14 |
| 17* | 5.665 | 1.42 | | | 4.08 |
| 18 | 11.711 | 1.95 | 1.74400 | 44.8 | 4.81 |
| 19 | −7.564 | 0.55 | 1.94595 | 18.0 | 4.96 |
| 20 | −14.906 | (variable) | | | 5.10 |
| 21 | ∞ | 2.00 | 1.51633 | 64.1 | 10.00 |
| 22 | ∞ | 1.00 | | | 10.00 |
| image plane | ∞ | | | | | aspheric data fourteenth surface

K = 4.96355e−001 A 4 = −4.23131e−004 A 6 = 3.95210e−007
A 8 = −1.99880e−007 fifteenth surface

K = −9.13571e+000 A 4 = 4.03772e−004 A 6 = 6.01677e−006
A 8 = 8.53314e−007 sixteenth surface

K = 2.48490e+002 A 4 = 1.83299e−004 A 6 = −2.27922e−005
A 8 = 1.20584e−005 seventeenth surface

K = −4.19812e−001 A 4 = −2.15403e−004 A 6 = 6.62333e−006
A 8 = 7.81993e−006 various data
zooming ratio 6.77

| | wide-angle | intermediate | telephoto |
|---|---|---|---|
| focal length | 4.02 | 8.06 | 27.19 |
| F-number | 2.88 | 3.04 | 3.18 |
| field angle | 33.24 | 16.25 | 3.79 |
| image height | 2.63 | 2.35 | 1.80 |
| lens overall length | 55.61 | 55.61 | 55.61 |
| BF | 6.80 | 6.80 | 6.80 |
| d5 | 1.07 | 9.02 | 18.73 |
| d10 | 18.41 | 10.46 | 0.75 |
| d13 | 3.00 | 2.49 | 2.06 |
| d15 | 1.21 | 1.72 | 2.15 |
| d20 | 4.48 | 4.48 | 4.48 | zoom lens unit data

| unit | starting surface | focal length |
|---|---|---|
| 1 | 1 | 35.37 |
| 2 | 6 | −7.25 |
| 3 | 11 | −119.84 |
| 4 | 14 | 6.72 |
| 5 | 16 | −30.16 |
| 6 | 21 | ∞ |

Table 1 illustrates a relationship between each conditional expression and a corresponding value of each numerical example.

TABLE 1

| Conditional expression | numerical example | | | |
|---|---|---|---|---|
| | 1 | 2 | 3 | 4 |
| (1) | 0.94 | 0.82 | 0.86 | 0.9 |
| (2) | 0.4 | 0.4 | 0.4 | 0.4 |
| (3) | 0.03 | 0 | 0 | 0 |
| (5) | −0.55 | −0.478 | −0.482 | −0.554 |
| (6) | 0.123 | 0.107 | 0.075 | 0.114 |
| (7) | 34.67 | 38.62 | 35.81 | 33.24 |

In Table 1, a value of the conditional expression (1) is calculated at the intermediate zoom position in each numerical example. A value of the conditional expression (2) is calculated at a zoom position in which the interval between the first lens unit and the second lens unit is changed by a variation amount from the wide-angle end to the telephoto end multiplied by 0.5. A value of the conditional expression (3) is calculated at the intermediate zoom position having a numerical value described in each numerical example.

As discussed above, each numerical example can provide a wide-angle and high magnification variable zoom lens having a small front lens diameter and a good optical characteristic.

Figure 9:
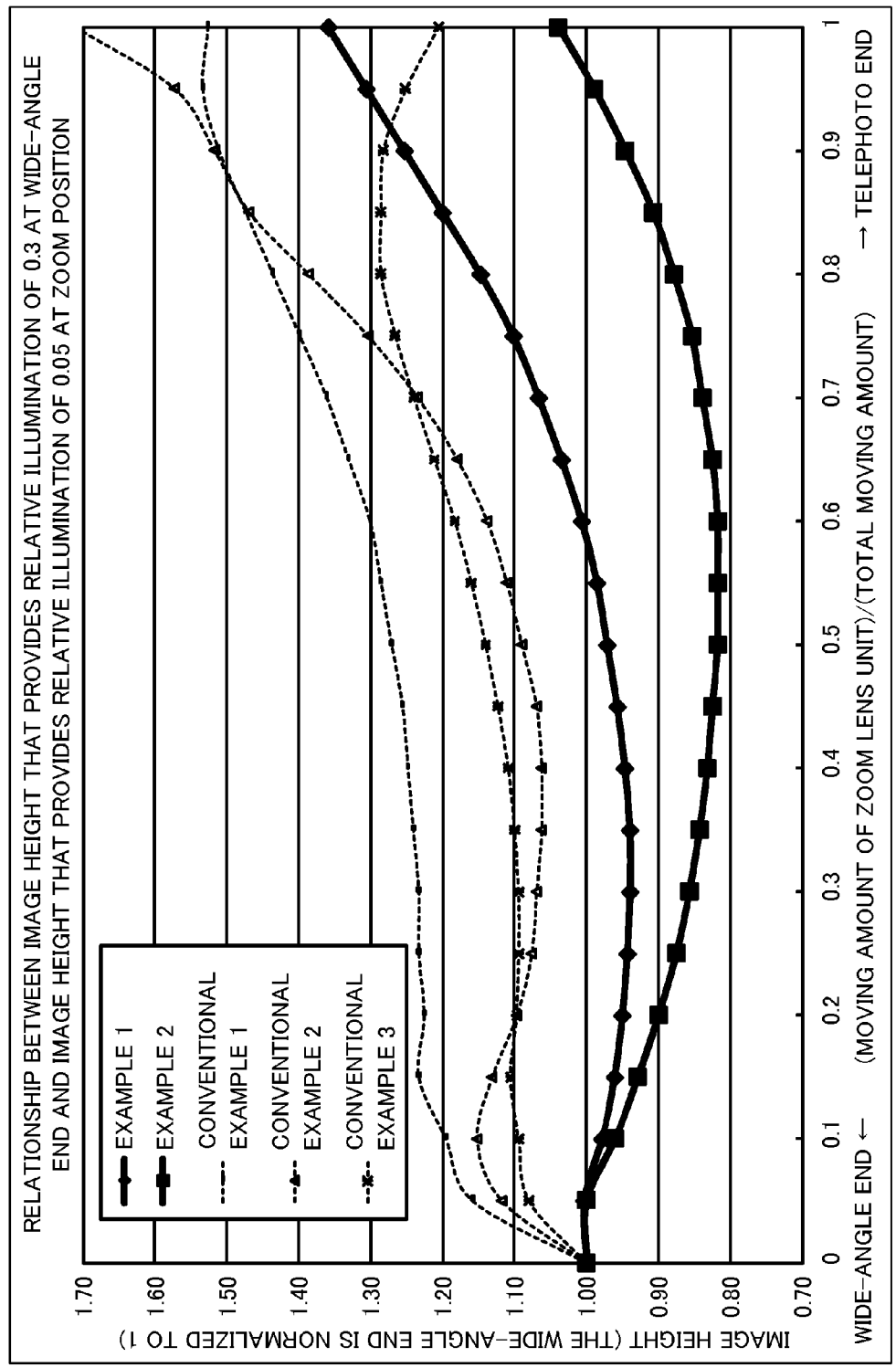
FIG. 9 is a graph that compares the numerical examples 1 and 2 with conventional examples.

FIG. 9 is a graph that compares the numerical examples 1 and 2 with the conventional examples, and illustrates a relationship between an image height Yw30 that provides a relative illumination of 0.3 at the wide-angle end and an image height Ym5 that provides a relative illumination of 0.05 at the zoom position. The abscissa axis is normalized by dividing the moving amount of the magnification varying lens unit in the zoom lens by the total moving amount. The ordinate axis is normalized by the image height that provides a relative illumination of 0.3 at the wide-angle end.

It is understood from FIG. 9 that a value of Ym5/Yw30 of all conventional examples exceeds 1. According to the numerical examples 1 and 2, there is a zoom position of the image height Ym5 that satisfies the conditional expression (1).

Figure 10:
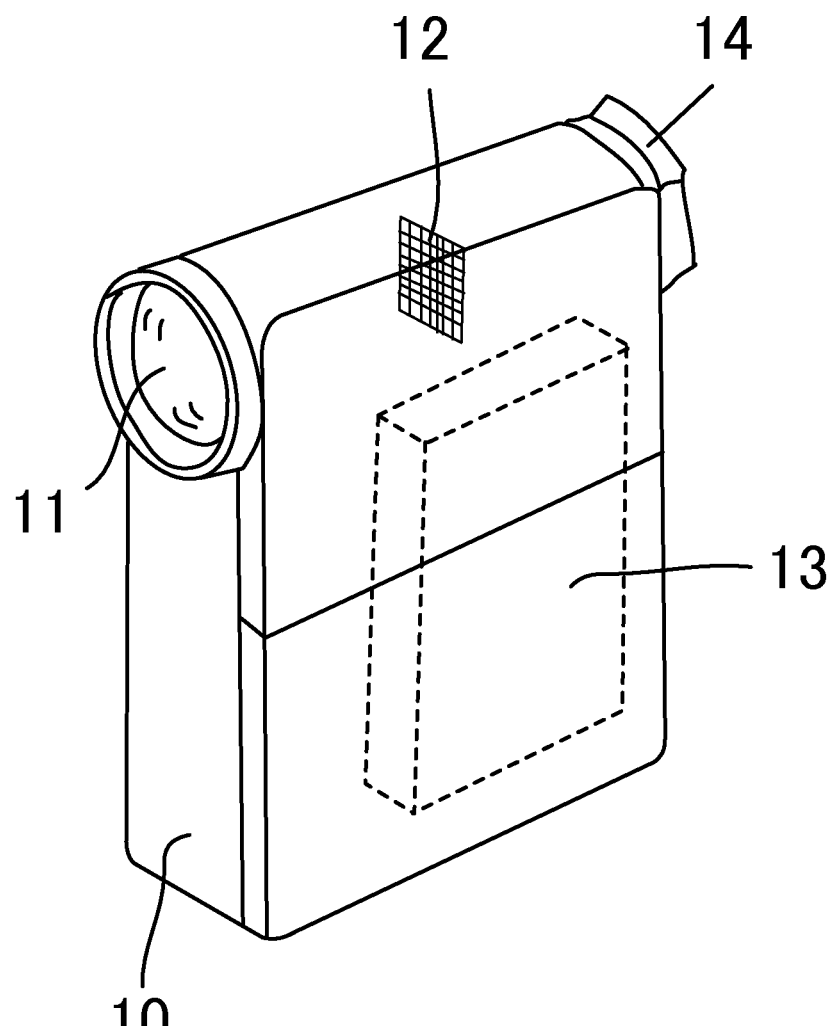
FIG. 10 is a perspective view of an image-pickup apparatus according to this embodiment.

Referring now to FIG. 10, a description will be given of an embodiment of an image-pickup apparatus (optical apparatus), such as a digital camera and a video camera, including the zoom lens of this embodiment in the image-pickup optical system.

In FIG. 10, reference numeral 10 denotes a video camera body. Reference numeral 11 denotes an image-pickup optical system having a zoom lens (magnification varying lens) configured to move in the optical axis direction during zooming according to this embodiment. Reference numeral 12 denotes an image-pickup element, such as a CCD, configured to receive an object image through the image-pickup optical system 11.

Reference numeral 13 denotes a recorder configured to record the object image received by the image-pickup element 12, reference numeral 14 denotes a viewfinder configured to enable the object image displayed on a display element (not illustrated), to be observed. The display element includes a liquid crystal element, etc., and displays the object image formed on the image-pickup element 12.

When the zoom lens of this embodiment is applied to the optical apparatus, such as a video camera, the optical apparatus (image-pickup apparatus) can be small and have a high optical performance. The image-pickup element using an electronic imaging sensor, such as a CCD, provides a high quality output image through electronic corrections of the aberration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-098522, filed Apr. 26, 2011 which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive or negative refractive power; and
   a fourth lens unit having a positive refractive power,
   wherein the following conditional expression is satisfied:

$0.50 < Ym5/Yw30 < 0.95$, where Yw30 denotes an image height that provides a relative illumination of 0.3 at a wide-angle end, and Ym5 denotes an image height that provides the relative illumination of 0.05 at a predetermined zoom position except for the wide-angle end and a telephoto end.

2. The zoom lens according to claim 1, wherein the following conditional expression is satisfied:

$-0.8 < fw/f2 < -0.4$, where fw denotes a focal length of the overall zoom lens at the wide-angle end, and f2 denotes a focal length of the second lens unit.

3. The zoom lens according to claim 1, wherein the first lens unit and the third lens units are fixed during the zooming.

4. The zoom lens according to claim 1, further comprising:
   a diaphragm on the image side of the first lens unit; and
   three or less lens units movable in an optical axis direction during zooming,
   wherein the diaphragm is fixed in the optical axis direction during the zooming.

5. The zoom lens according to claim 4, wherein:
   the second lens unit is arranged on the object side of the diaphragm, and
   wherein the first and second lens units are composed of nine lenses or less arranged on the object side of the diaphragm.

6. The zoom lens according to claim 1, wherein the following conditional expression is satisfied:

$0.05 < fw/f1 < 0.14$, where fw denotes a focal length of the overall zoom lens at the wide-angle end, and f1 denotes a focal length of the first lens unit.

7. The zoom lens according to claim 1, wherein the following conditional expression is satisfied:

$31° < \tan^{-1}(Yw/fw) < 48°$, where Yw is a maximum image height at the wide-angle end, and fw is a focal length of the overall zoom lens at the wide-angle end.

8. The zoom lens according to claim 1, further comprising, on the image side of the fourth lens unit:
a fifth lens unit having a negative refractive power,
wherein the third lens unit has the negative refractive power.

9. An image-pickup apparatus comprising:
a zoom lens; and
an image pickup element configured to receive light of an image formed by the zoom lens,
wherein the zoom lens comprises, in order from an object side to an image side:
a first lens unit having a positive refractive power;
a second lens unit having a negative refractive power;
a third lens unit having a positive or negative refractive power; and
a fourth lens unit having a positive refractive power,
wherein the following conditional expression is satisfied:

$$0.50 < Ym5/Yw30 < 0.95,$$

where Yw30 denotes an image height that provides a relative illumination of 0.3 at a wide-angle end, and Ym5 denotes an image height that provides the relative illumination of 0.05 at a predetermined zoom position except for the wide-angle end and a telephoto end.

10. The image pickup apparatus according to claim 9, wherein the zoom lens further comprises on the image side of the fourth lens unit:
a fifth lens unit having a negative refractive power,
wherein the third lens unit has the negative refractive power.

11. A zoom lens comprising, in order from an object side to an image side:
a first lens unit having a positive refractive power;
a second lens unit having a negative refractive power;
a third lens unit having a positive or negative refractive power; and
a fourth lens unit having a positive refractive power,
wherein the following conditional expression is satisfied:

$$0.50 < Ym5/Yw30 < 0.95;$$

$$0.05 < fw/f1 < 0.14;$$

$$-0.8 < fw/f2 < -0.4; \text{ and}$$

$$31° < \tan^{-1}(Yw/fw) < 48°,$$

where Yw30 denotes an image height that provides a relative illumination of 0.3 at a wide-angle end, Ym5 denotes an image height that provides the relative illumination of 0.05 at a predetermined zoom position except for the wide-angle end and a telephoto end, Yw is a maximum image height at the wide-angle end, fw denotes a focal length of the overall zoom lens at the wide-angle end, f1 denotes a focal length of the first lens unit, and f2 denotes a focal length of the second lens unit.

* * * * *